US011261705B2

(12) United States Patent
Wang et al.

(10) Patent No.: US 11,261,705 B2
(45) Date of Patent: Mar. 1, 2022

(54) SYSTEMS AND METHODS FOR TREATING FLUIDS IN OILFIELD FACILITIES (71) Applicant: Saudi Arabian Oil Company, Dhahran (SA)

(72) Inventors: Qiwei Wang, Dhahran (SA); Waleed N. Al-Nasser, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/101,663

(22) Filed: Aug. 13, 2018

(65) Prior Publication Data

US 2020/0048990 A1 Feb. 13, 2020

(51) Int. Cl.
 *E21B 37/06* (2006.01)
 *C09K 8/528* (2006.01)
 *C09K 8/536* (2006.01)

(52) U.S. Cl.
 CPC .............. *E21B 37/06* (2013.01); *C09K 8/528* (2013.01); *C09K 8/536* (2013.01); *C09K 2208/22* (2013.01); *C09K 2208/26* (2013.01); *C09K 2208/32* (2013.01)

(58) Field of Classification Search
 None
 See application file for complete search history.

(56) References Cited

U.S. PATENT DOCUMENTS

| | | |
|---|---|---|
| 3,704,750 A | 12/1972 | Miles et al. |
| 5,090,479 A | 2/1992 | Read et al. |
| 5,263,539 A | 11/1993 | Salimi et al. |
| 5,399,270 A | 3/1995 | Hen |
| 5,922,652 A | 7/1999 | Kowalski et al. |

(Continued)

FOREIGN PATENT DOCUMENTS

| | | | |
|---|---|---|---|
| CN | 105086986 | * | 11/2015 |
| CN | 105112040 | * | 12/2015 |

(Continued)

OTHER PUBLICATIONS

Al-Qahtani, "Scale Inhibitor Squeeze Treatment in a Tight Carbonate Reservoir—Problems and Solutions," SPE-80402, presented at the SPE 5th International Symposium on Oilfield Scale, Jan. 29-30, 2003, 11 pages.

Bourne et al., "Effective Treatment of Subsea Wells with a Solid Scale Inhibitor System," SPE-60207, International Symposium on Oilfield Scale, Jan. 26-27, 2000, 9 pages.

Fitgerald and Cowie, "A History of Frac-Pack Scale-Inhibitor Deployment," SPE-112474, presented at the 2008 SPE International Symposium and Exhibition on Formation Damage Control, Feb. 13-15, 2008, 8 pages.

(Continued)

*Primary Examiner* — Charles R Nold
(74) *Attorney, Agent, or Firm* — Fish & Richardson P.C.

(57) ABSTRACT

Treatment chemicals (for example, scale inhibition chemicals) can be applied to fluids in a pipeline by diverting a side stream of the produced water from a pipeline into a vessel containing a solid material to release of an active fluid treatment agent from the solid material into the diverted produced water; merging the diverted produced fluid containing the active fluid treatment agent into the pipeline; and adjusting a flow rate of the diverted side stream of the produced water to change a level of the active fluid treatment agent in the flow of produced water in the pipeline. Treatment systems can include a pipeline, a vessel containing a solid treatment material; a bypass line providing a fluid connection between the pipeline and an inlet of the vessel; and a return line providing a fluid connection between an outlet of the vessel and the pipeline.

15 Claims, 4 Drawing Sheets

(56) References Cited

U.S. PATENT DOCUMENTS

| | | | |
|---|---|---|---|
| 6,231,214 | B1 | 5/2001 | Haugaard |
| 7,049,272 | B2 | 5/2006 | Sinclair et al. |
| 7,332,459 | B2 | 2/2008 | Collins et al. |
| 7,491,682 | B2 | 2/2009 | Gupta et al. |
| 7,640,981 | B2 | 1/2010 | Collins et al. |
| 8,343,897 | B2 | 1/2013 | Mongomerie et al. |
| 8,439,115 | B2 | 5/2013 | Morris |
| 9,810,040 | B2 | 11/2017 | Morrow et al. |
| 2004/0043906 | A1 | 3/2004 | Heath |
| 2006/0124301 | A1 | 6/2006 | Gupta et al. |
| 2006/0162928 | A1 | 7/2006 | Collins et al. |
| 2009/0038799 | A1* | 2/2009 | Garcia-Lopez de Victoria ........... C09K 8/528 166/280.2 |
| 2010/0243252 | A1* | 9/2010 | Luharuka ............... E21B 43/267 166/283 |
| 2014/0263057 | A1 | 9/2014 | Smith et al. |
| 2017/0020062 | A1* | 1/2017 | Lovato ................. A01C 23/042 |
| 2018/0340115 | A1* | 11/2018 | Fouchard ................ B02C 23/00 |

FOREIGN PATENT DOCUMENTS

| | | | |
|---|---|---|---|
| CN | 107794030 | * | 3/2018 |
| CN | 108929669 | * | 12/2018 |
| CN | 101608543 | * | 12/2019 |
| DE | 202015101111 | | 6/2016 |
| EP | 3357868 | | 8/2018 |
| WO | 2002012674 | | 2/2002 |
| WO | WO 2011121107 | | 10/2011 |

OTHER PUBLICATIONS

Frigo et al., "Chemical Inhibition of Halite Scaling in Topsides Equipment," SPE-60191, presented at the 2000 Second International Symposium on Oilfield Scale, Jan. 26-27, 2000, 7 pages.

Gupta et al., "A Chemical Inhibitor-Infused, High-Strength Proppant Additive for Reservoir Flow Assurance against Scale Deposition in Wells with High Intervention Costs," SPE-165078, presented at the SPE European Formation Damage Conference and Exhibition on Jun. 5-7, 2013, 11 pages.

Hsu et al., "Encapsulated Scale Inhibitor Treatments experience in the Ghawar Field, Saudi Arabia," SPE 60209, presented at the 2000 Second International Symposium on Oilfield Scale, Jan. 26-27, 2000, 6 pages.

Hustad, "Downhole Chemical Injection Lines—Why Do They Fail? Experiences, Challenges and Application of New Test Methods," SPE-154967, presented at the SPE International Conference and Exhibition on Oilfield Scale, May 30-31, 2012, 11 pages.

Raju, "Successful Scale Mitigation Strategies in Saudi Arabian Oil Fields," SPE-121679, presented at the 2009 SPE International Symposium on Oilfield Chemistry, Apr. 20-22, 2009, 10 pages.

PCT International Search Report and Written Opinion in International Appln. No. PCT/US2019/045405, dated Oct. 16, 2019, 15 pages.

GCC Examination Report issued in GCC Application No. 2019-38087 dated Sep. 1, 2020, 4 pages.

GCC Examination Report issued in GCC Application No. 2019-38087, dated Mar. 28, 2021, 4 pages.

\* cited by examiner

SYSTEMS AND METHODS FOR TREATING FLUIDS IN OILFIELD FACILITIES

TECHNICAL FIELD

This disclosure relates to treating fluids in oilfield facilities, in particular to treating fluids to inhibit scale in surface components of oilfield facilities.

BACKGROUND

Inorganic scale deposition has been a persistent problem in many oil and gas production systems. Scale deposits can restrict hydrocarbon flow, damage equipment, induce localized corrosion, and interfere with oil-water separation. For example, calcium carbonate scale deposition in surface flowlines is a significant issue for many oil wells and has been known to interrupt or stop oil production. In some cases, wells have been in a shut-in state due to heavy calcium carbonate scale in flowlines, leading to enormous economic losses. Many approaches have been deployed to control scale formation.

SUMMARY

This disclosure describes systems and methods that can be used in treating fluids in oilfield facilities. For example, these systems and methods can be used to treat fluids to inhibit scale in surface components of oilfield facilities. In another example, these systems and methods could be used to address other production chemistry issues such as corrosion and emulsion.

In contrast to the solid scale inhibitor deployment techniques that place scale inhibitors in the rathole at the bottom of a well or mixed with proppant or sand for well completion, these systems and methods include adding a solid scale inhibitor into a vessel in line with a surface pipeline. In a representative example, a vessel loaded with solid-state inhibitor is connected to a produced fluid pipeline from an oil or gas well near wellhead and some of the produced water is diverted into the vessel. The diverted water in the holding rank releases active scale inhibition compounds from the solid inhibitor product. Water from the vessel with the active scale inhibition compounds is returned to the pipeline, which results in the downstream pipeline being treated with the inhibitor to prevent scale deposition. The concentration of scale inhibitor in the main stream can be controlled by adjusting the flow rate of the side stream. In addition, and in contrast to existing methods of continuously injecting a liquid scale inhibitor, this approach does not require a metering injection pump, which significantly simplifies the treatment procedure, reduces maintenance cost, and improves treatment reliability.

Some systems and methods use a solid scale inhibitor material at a surface facility to introduce active scale inhibition compounds into pipelines carrying fluids produced from a wellbore by diverting a side stream of the produced water into a vessel holding the solid scale inhibitor material and returning the diverted flow into the pipeline. The diverted produced water enters the container and causes a release of active scale inhibition compounds from solid inhibitor into the produced water. The diverted produced water, now containing the active scale inhibition compounds, merges with the produced fluid in the pipeline. The concentration of scale inhibitor in the mixed stream can be adjusted to reduce or prevent scale buildup in surface components of the system by adjusting the flow rate of the diverted water.

Some methods of inhibiting scale in an oilfield facility include diverting a side stream of produced water from a pipeline into a vessel containing a solid scale inhibitor material to release of active scale inhibition compounds from the solid scale inhibitor material into the diverted produced water, returning the diverted produced fluid containing the active scale inhibition compounds into the pipeline, and adjusting a flow rate of the diverted side stream of the produced water to change a level of active scale inhibition compounds in the flow of produced water in the pipeline.

In another aspect, methods of treating fluids in an oilfield facility include diverting a side stream of the produced water from a pipeline into a vessel containing a solid material to release of an active fluid treatment agent from the solid material into the diverted produced water, merging the diverted produced fluid containing the active fluid treatment agent into the pipeline, and adjusting a flow rate of the diverted side stream of the produced water to change a level of the active fluid treatment agent in the flow of produced water in the pipeline. In some embodiments, the fluid treatment agent includes one or more of: corrosion inhibitors, paraffin inhibitors, asphaltene inhibitors, oxygen scavengers, biocides, gas hydrate inhibitors, salt inhibitors, foaming agent, emulsion breakers, and surfactants.

Embodiments of these methods can include one or more of the following features.

In some embodiments, methods include measuring the level of the scale inhibition compounds in the produced water in the pipeline downstream of the vessel. In some embodiments, methods include replacing the sold scale inhibitor material when adjusting the flow rate of the diverted side stream fails to maintain the level of active scale inhibition compounds in the flow of produced water in the pipeline at or above a threshold level. In some embodiments, methods include setting the threshold level based at least in part on the length of flowlines through the oilfield facility.

In some embodiments, adjusting the flow rate of the diverted side stream includes controlling a valve upstream of the vessel.

In some embodiments, adjusting the flow rate of the diverted side stream includes controlling a valve disposed in the pipeline between a location in the pipeline where the side stream is diverted and a location in the pipeline where the side stream is returned In some embodiments, adjusting the flow rate of the diverted side stream includes controlling a valve downstream of the vessel.

In some embodiments, the pipeline is a surface pipeline and the flow of produced water is produced from a well of the oilfield facility.

In some embodiments, the active scale inhibition compounds include one or more of: phosphonates, phosphonate esters, and polymeric compounds.

In some embodiments, the solid scale inhibitor material is in the form of capsules and the active scale inhibition compounds are enclosed by permeable or semi-permeable materials.

In some embodiments, the solid scale inhibitor materials include a porous solid material with high surface areas with the active scale inhibition compounds adsorbed into the porous solid material. In some embodiments, the porous solid material includes one or more of: activated carbon, zeolite, cluster of nanoparticles and carbon nanotubes, and microporous thin films.

In some embodiments, methods include continuously diverting the side stream of the produced water from the pipeline into the vessel, and continuously merging the diverted produced fluid containing the active fluid treatment agent back into in the flow of produced water in the pipeline.

Some scale prevention systems for use in an oilfield facility include a pipeline carrying a flow of produced water from a wellhead, a vessel containing a solid scale inhibitor material configured to release active scale inhibition compounds into produced water in the vessel, a bypass line providing a fluid connection between the pipeline and an inlet of the vessel, and a return line providing a fluid connection between an outlet of the vessel and the pipeline. Embodiments of these systems can include one or more of the following features.

In some embodiments, systems include a flowmeter disposed to measure a flowrate in the bypass line or the return line.

In some embodiments, systems include a main valve in the pipeline positioned between a location at which the bypass line connects to the pipeline and a location at which the return line connects to the pipeline.

In some embodiments, systems include a sensor downstream of a location at which the return line connects to the pipeline, the sensor operable to measure a level of the active scale inhibition compounds in produced water in the pipeline.

In some embodiments, systems include a controller operatively coupled to the main valve and to the sensor, where the controller is configured to adjust a flow rate of the produced water entering the vessel based at least in part on a signal received from the sensor.

In some embodiments, systems include a bypass valve in the bypass line. In some embodiments, systems include a return valve in the return line.

In some embodiments, the active scale inhibition compounds include one or more of: phosphonates, phosphonate esters, and polymeric compounds.

In some cases, these systems and methods can significantly simplify the treatment process, reduce maintenance costs, and provide efficient and reliable treatment results. In particular, these systems and methods can provide continuous injection of scale inhibitor to protect against scale deposition in surface components of oilfield facilities such as, for example, oil field flowlines. This approach can provide long-term, more consistent protection than intermittent approaches such as existing squeeze treatments.

In addition to being more effective than existing oilfield scale control solutions, these systems and methods are anticipated to reduce operation costs due to a simplified technique and lower maintenance requirement. In some cases, the ongoing controlled application scale inhibitors lowers overall inhibitor requirements relative to approaches that apply pulses of inhibitor to the oilfield facilities. This scale treatment program is easy to adjust in response to changing conditions and fluid being treated. The control provided by this approach provides a an advantage over approaches, such as placement of solid inhibitor in rathole at the bottom of well below tubing, in which there is no control on interaction of produced fluid with solid inhibitor and the resulting concentration of active scale inhibitor released into the produced water. This approach also avoids the downhole restrictions in fluid flow and associated impacts on production that can result from approaches that place a container with treatment chemicals in a downhole tubular. By applying the scale inhibitor at the surface downstream of the well, this approach can also reduce or eliminate the potential of formation damage induced by squeeze treatment.

The system and methods described can be effective in maintaining effective levels of treatment chemicals in surface installations. This is important, for example, because scale formation is more severe at the surface than downhole due to changes in temperature and pressure. The reduction in pressure as produced fluid flows from the subsurface to the surface decreases scaling mineral solubility and, therefore, increases the scaling potential for pH sensitive scale types, such as carbonate and sulfide.

The systems and methods of this disclosure can provide controllable levels of scale inhibitors in surface installations in contrast to squeeze treatments and downhole solid inhibitor batch treatments are often only designed to provide scale inhibition for downhole equipment, which typically have less scaling problem due to relatively low scaling tendency and a short residence time of the produced water. Moreover, the scale inhibitor concentrations in the produced water in the downhole-focused treatments are insufficient to prevent scale formation when the produced water travels to surface. Increased scaling tendency, coupled with longer residence life, especially for producers with long flowlines, demands higher scale inhibitor concentration to stop scale formation at surface.

These systems and methods can also protect formation productivity by introducing treatment chemicals after produced fluids leave a well. In contrast, scale inhibitor squeeze treatment systems rely on pumping an inhibitor product into a reservoir under high pressures and part of the pumped inhibitor produce is retained by reservoir rocks—by either an adsorption or precipitation processes. During production, the retained inhibitors are gradually released into the produced water and scale formation is be prevented if the released scale inhibitor concentration is high enough. However, there is no control over the inhibitor concentration and frequent repeated treatments are often required. Moreover, this treatment can cause formation damage, which reduces hydrocarbon recovery.

The systems and methods of this disclosure can more effectively provide protection than approaches in which solid-state scale inhibitors used for downhole scale control have high strength solid inhibitor particles are incorporated with the fracturing proppants. However, because of the limited amount of inhibitor added, these downhole methods only provide temporary scale protection.

The details of one or more implementations are set forth in the accompanying drawings and the description below. Other features and advantages will be apparent from the description and drawings, and from the claims.

DETAILED DESCRIPTION

This specification describes systems and methods of treating fluids produced from a well by diverting a side stream of produced fluids into a container holding solid treatment material. The diverted fluids release treatment compounds from solid treatment material before being returned to the main stream of the produced fluids. For example, these systems and methods can be used to control scaling deposition in oil well surface flowlines and trunklines. In this approach, a side stream of produced water is diverted into a container holding solid scale inhibitor material. The diverted produced water enters the container and releases active scale inhibition components from solid inhibitor. The diverted produced water, now containing active scale inhibition components, merges with the produced fluid in the pipeline. By adjusting the flow rate of the diverted water, scale inhibitor concentration in the mixed stream is adjusted to reduce or prevent scale buildup in surface components of the system.

This approach can reduce or eliminate production losses due to scale deposition. The solid-state scale inhibitor can provide a continuous supply of scale control ingredient without using an injection pump. In contrast to pulsed squeeze treatments, this approach can provide long-term ongoing protection to equipment. The described systems and methods can be used in addition to the squeeze treatment to prevent scale formation in surface flowlines and facilities as squeeze treatment is mainly used to control scale in subterranean formation. In addition, this approach is anticipated to reduce operation costs relative to systems and methods that rely on continuous injection of treatment compounds.

These systems and methods can also be used to introduce other types of treatment agents such as, for example, corrosion inhibitors, paraffin inhibitors, asphaltene inhibitors, oxygen scavengers, biocides, gas hydrate inhibitors, salt inhibitors, foaming agent, emulsion breakers and surfactants, into a oilfield facility. Integration of different oilfield chemical treatments into a single process can be performed by adding different treatment chemicals in a solid form in the same vessel.

Figure 1:
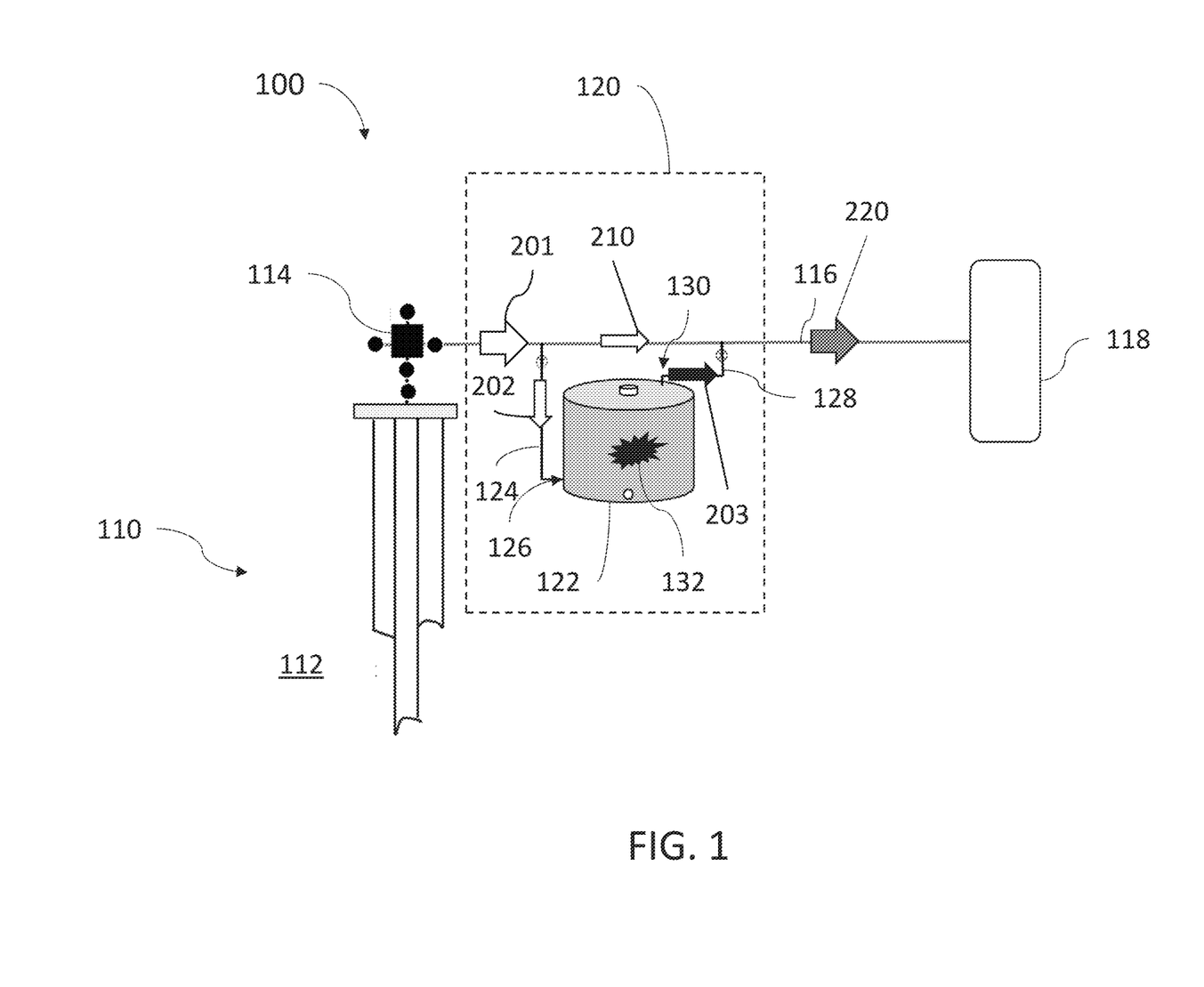
FIG. 1 is a schematic view of an oilfield facility with a well and surface pipeline including a treatment system.

FIG. 1 shows an oilfield facility 100 with a well 110 extending into a subterranean formation 112 from a wellhead 114. A pipeline 116 extends between the wellhead and downstream components 118 (for example, trunklines, oil-water separators, and water knockout units) of the oilfield facility 100 to transport fluids (for example, produced water) produced from the well to the downstream components 118. A treatment system 120 is attached to the flowline 116. In this case, the treatment system 120 is a scale inhibitor system and is described with respect to scale inhibitors. However, as previously noted, some treatment systems are used to supply other treatment chemicals instead of or in addition to scale inhibitors.

The treatment system 120 includes a vessel 122, a bypass line 124 providing a fluid connection between the pipeline 116 and an inlet 126 of the vessel 122; and a return line 128 providing a fluid connection between an outlet 130 of the vessel 122 and the pipeline 116. The return line 128 directs the return flow 203 of produced water (containing the active scale inhibition compounds) to the pipeline 116 at a location downstream of the connection of the bypass line 124.

In the treatment system 120, the vessel 122 is a tank. Some treatment systems use non-tank vessels such as, for example, chemical storage drums or holding ponds. A solid scale inhibitor material 132 is disposed in the vessel 122 to release active scale inhibition compounds or other treatment chemicals into fluids flowing through the vessel 122.

In operation, fluid flowing from the wellhead 114 flows through the pipeline 116 as indicated by arrow 201. A portion of the fluid is diverted through the bypass line 124 as indicated by arrow 202 while the rest of the fluid continues down the pipeline 116 as indicated by arrow 210.

The diverted fluid flows through the vessel 122. Contact between the diverted fluid and the solid-state treatment chemicals 132 in the vessel 122 releases a portion of the treatment chemicals into the diverted flow. The diverted fluid and released treatment chemicals flow through the return line 128 as indicated by arrow 203 to merge with the fluid that was not diverted to form a treated fluid stream that flows down the pipeline 116 as indicated by arrow 220. By mixing the remaining flow 210 with the returned flow 203, the concentration of treatment chemicals 133 (for example, active scale inhibition compounds) in the treated stream 220 to prevent scale formation in downstream is controlled by the flowrate and concentration of the treatment chemicals 133 of the return flow 203.

While the oilfield facility 100 is described as a surface facility having a surface pipeline 116, these systems and methods can also be applied in other settings such as, for example, on an offshore platform or in a facility with underground pipelines.

Figure 2:
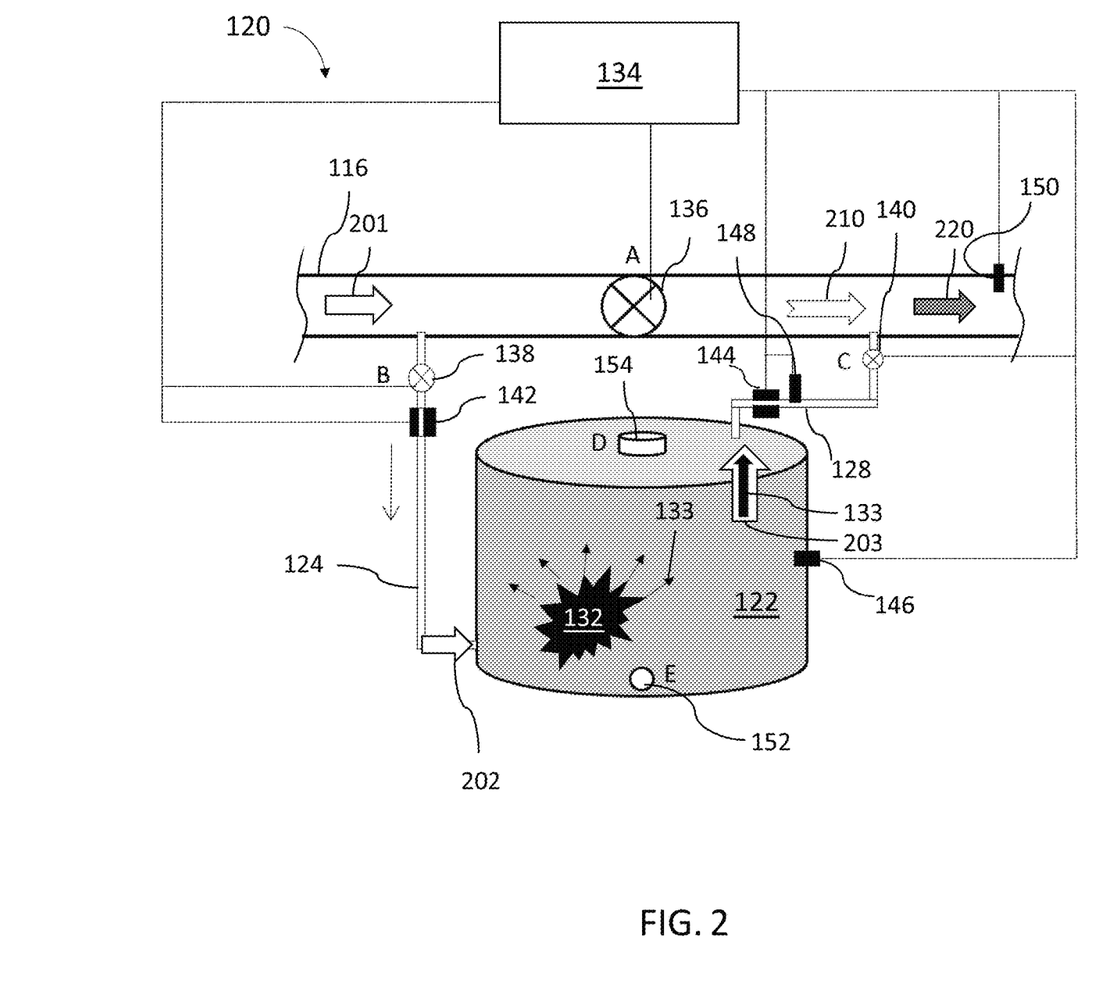
FIG. 2 is a schematic view of the treatment system of FIG. 1 showing the control system.

FIG. 2 is a more detailed schematic of the treatment system 120 showing a control system 134 that is configured to control the flowrate and concentration of the active scale inhibition compounds 133 of the return flow 203. The control system 134 is operatively coupled to a main valve 136 in the pipeline 116 between the bypass line 124 and the return line 128. The treatment system 120 also includes a bypass valve 138 in the bypass line 124 and a return valve 140 in the return line 128. Both the bypass valve 138 and the return valve 140 are also operatively connected to the controller 134. The control system 134 is also in communication with flowmeters 142, 144 and sensors 146, 148, 150. The sensor 146 measures chemical concentrations in the vessel 122, the sensor 148 measures chemical concentrations in the return line 128, and the sensor 150 measures chemical concentrations in the pipeline 116 downstream of a location at which the return line 128 connects to the pipeline 116. For example, the sensor 150 can be operable to measure a level of the active scale inhibition compounds in produced water in the pipeline 116. In this situation, the controller can be operatively coupled to the main valve 136 and to the sensor 150 and configured to adjust a flow rate of the produced water entering the vessel 122 based at least in part on a signal received from the sensor 150.

The control system of the treatment system 120 is configured to provide sufficient inhibitor concentration in a simple and cost effective way by using the solid scale inhibitors in the vessel 122 and controlling the flowrate of the bypass flow 124. In operation, the control system 134 controls the treatment system 120 to provide the scale inhibitor compounds 133 in a concentration sufficient to control scale deposition in pipeline 116 and associated equipment (for example, downstream equipment 118). For example, scale inhibitor concentrations of 5 to 15 parts per million (ppm) have been found to be appropriate for surface flowlines and oil-water separation units. Operation of the main valve 136, the bypass valve 138, and the return valve 140 controls the flowrate of the bypass flow 202, based on the flowrate of the produced water 201 in the pipeline.

In treatment systems where the return line 128 is the only fluid exit from the vessel 122, the flowrate of the bypass flow 202 equals the flowrate of the return flow 128 once the vessel 122 is full. In some systems, a pump (not shown) is provided in the vessel 122 in order to provide a pressure on the return line 128 such that the vessel 122 does not have to support the pressure of the fluid in the bypass line 128 (for example, the vessel is not full and the pump and one or more of the valves 136, 136, 138 are used to control the fill level of the vessel 122).

In this system, the vessel 122 has ports 152, 154 that can be used to access the interior of the vessel 122. For example, the ports 152, 154 can used during tank cleaning and maintenance and during the removal and replacement of depleted solid material. Some systems have more or fewer access ports.

In treatment system 120, the vessel 122 is a holding tank storing a volume of produced water. In some systems, the vessel is merely a holding unit for the solid scale inhibitor material 132 and the bypass flow 202 passes through the holding unit without settling such that the active scale inhibition compounds 133 are introduced into the stream of the bypass flow 202 and delivered to the return line 203. In some instances, the vessel 122 is between 0.5 and 20 cubic meters in volume, and the bypass lines 124 and return line 128 are between 0.25 inches and 2.0 inches in internal diameter.

The solid scale inhibitor material 132 can be in different forms. In some instances, the solid scale inhibitor material 132 is a precipitated solid formed by reacting the active scale inhibition compounds 133 with other chemical compounds, such as multi-valence cations such as alkaline earth metal ions (for example, calcium, magnesium, barium, and strontium) or heavy metal ions (for example, iron, nickel, copper, and zinc). In some instances, the solid scale inhibitor material 132 is in the form of capsules, where the active scale inhibition compounds 133 are enclosed by permeable or semi-permeable materials. In some instances, the solid inhibitor material 132 is prepared by adsorbing active scale inhibition compounds 133 on porous solid materials with high surface areas, such as activated carbon, zeolite, cluster of nanoparticles and carbon nanotubes, or microporous thin films.

In some instances, the active scale inhibition compounds 133 are based on phosphonates, phosphonate esters, or polymeric compounds, or a combination of two or more different types of active scale inhibition compounds. Phosphonate inhibitors include all organic compounds with one or more ortho-phosphate function groups, these include but not limited to amino trimethylene phosphonate, bishexamethylene triamine pentamethylene phosphonate, hexamethylenediamine tetramethylene phosphonate, diethylenetriamine pentamethylene phosphonate, ethylene diamine tetramethylene phosphonate, 1-hydroxyethylidene-1,1-diphosphonate, hexamethylene diamine tetramethylene phosphonate, polyamino polyether methylene phosphonate, and 2-phosphonobutane-1,2,4-tricarboxylic acid. Examples of phosphate ester inhibitors are triethanolamine phosphate ester, hydroxyamine phosphate ester, and polyhydric alcohol phosphate ester. Examples of polymeric scale inhibitors are based on polyacrylate or polymaleic function groups such as polyacrylate or polymaleic acid homopolymer, their sulfonated forms, or other co- or multi-polymerirs base on these function groups.

Figure 3:
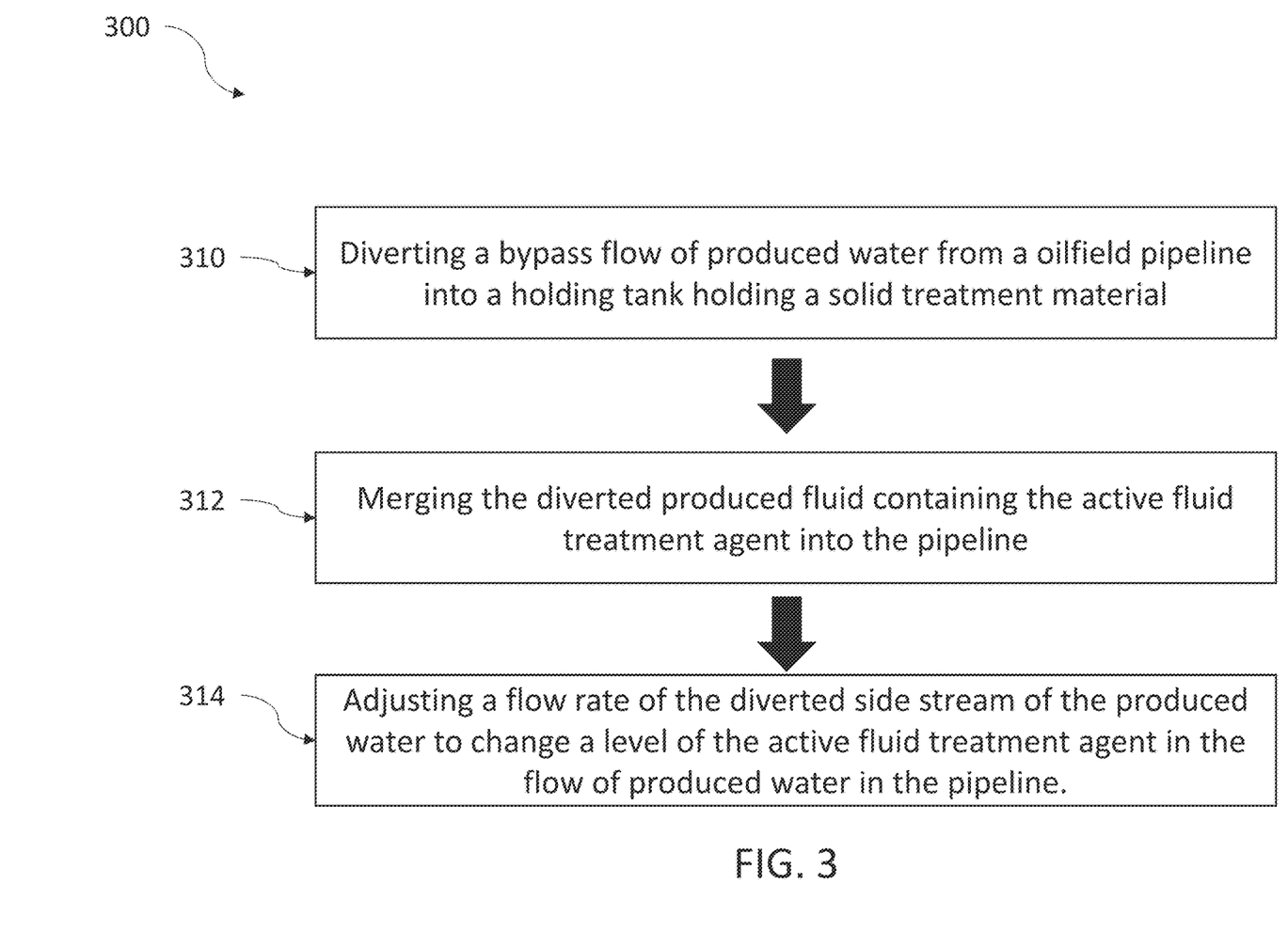
FIG. 3 is a flowchart of a method of treating fluids.

FIG. 3 is a flowchart of a method 300 of treating fluids in an oilfield facility. The method 300 is described with reference to the system components shown in FIG. 1 and FIG. 2. The method 300 includes diverting a side stream of the fluids from a pipeline 116 into a vessel 122 containing a solid material 132 to release of an active fluid treatment agent 133 from the solid material 132 into the diverted produced water (step 310). The pipeline can be a surface pipeline with the flow of produced water produced from a well of the oilfield facility. Some methods include continuously diverting the side stream of the produced water from the pipeline into the vessel; and continuously merging the diverted produced fluid containing the active fluid treatment agent back into in the flow of produced water in the pipeline.

In methods for treating produced water to reduce the likelihood of scale formation, the side stream 202 of produced water 201 is diverted from a pipeline 116 of an oilfield facility 100 into a vessel 122 containing a solid scale inhibitor material 132. The produced water in the vessel 122 causes a release of active scale inhibition compounds 133 from the solid scale inhibitor material 132 into the produced water. In some cases, the active scale inhibition compounds include one or more of: phosphonates, phosphonate esters, and polymeric compounds. The solid scale inhibitor material can be in the form of be in the form of capsules in which the active scale inhibition compounds are enclosed by permeable or semi-permeable materials. The solid scale inhibitor materials also can be in the form of a porous solid material with high surface areas (for example, one or more of: activated carbon, zeolite, cluster of nanoparticles and carbon nanotubes, and microporous thin films) with the active scale inhibition compounds adsorbed into the porous solid material.

In some methods, the active fluid treatment agent includes one or more of a corrosion inhibitor, a paraffin inhibitor, an asphaltene inhibitor, an oxygen scavenger, a biocide, a gas hydrate inhibitor, a salt inhibitor, a foaming agent, an emulsion breaker, and a surfactant.

The diverted produced fluid containing the active fluid treatment agent 133 is then merged into the pipeline 116 (step 312). In methods for treating produced water to reduce the likelihood of scale formation, the produced water in the vessel 122 containing active scale inhibition compounds 133 is returned to the pipeline 116 of the oilfield facility 100 to merge with the remaining flow 210 of produced water in the pipeline 116.

The flow rate of the diverted side stream of the produced water is adjusted to change a level of the active fluid treatment agent in the flow of produced water in the pipeline 116 (step 314) downstream of the treatment system 120. The flow rate of the diverted side stream can be adjusted by controlling a valve upstream of the vessel, by controlling a valve disposed in the pipeline between a location in the pipeline where the side stream is diverted and a location in the pipeline where the side stream is returned, by controlling a valve downstream of the vessel or some combination of these approaches.

Methods for treating produced water to reduce the likelihood of scale formation can include measuring the level of the scale inhibition compounds in the produced water in the pipeline downstream of the vessel. When adjusting the flow rate of the diverted side stream fails to maintain the level of active scale inhibition compounds in the flow of produced water in the pipeline at or above a threshold level, the solid scale inhibitor material can be replaced. The threshold level can be set based at least in part on the length of flowlines through the oilfield facility.

The control system 134 can be a manual control system or some or all of the described functionality ("the functions") can be implemented, at least in part, via a computer program product, for example, a computer program tangibly embodied in an information carrier, such as one or more non-transitory machine-readable media or storage device, for execution by, or to control the operation of, one or more data processing apparatus, for example, a programmable processor, a DSP, a microcontroller, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed one or more processing devices at one site or distributed across multiple sites and interconnected by a network.

Actions associated with implementing all or part of the functions can be performed by one or more programmable processors or processing devices executing one or more computer programs to perform the functions of the processes described herein. All or part of the functions can be implemented as, special purpose logic circuitry, for example, an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While this specification contains many specific implementation details, these should not be construed as limitations on the scope of what may be claimed, but rather as descriptions of features that may be specific to particular embodiments of these systems and methods. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Elements described in detail with reference to one embodiment, implementation, or application optionally may be included, whenever practical, in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

Particular embodiments of the subject matter have been described. However, other systems and methods can be used to implement the described approaches.

Figure 4:
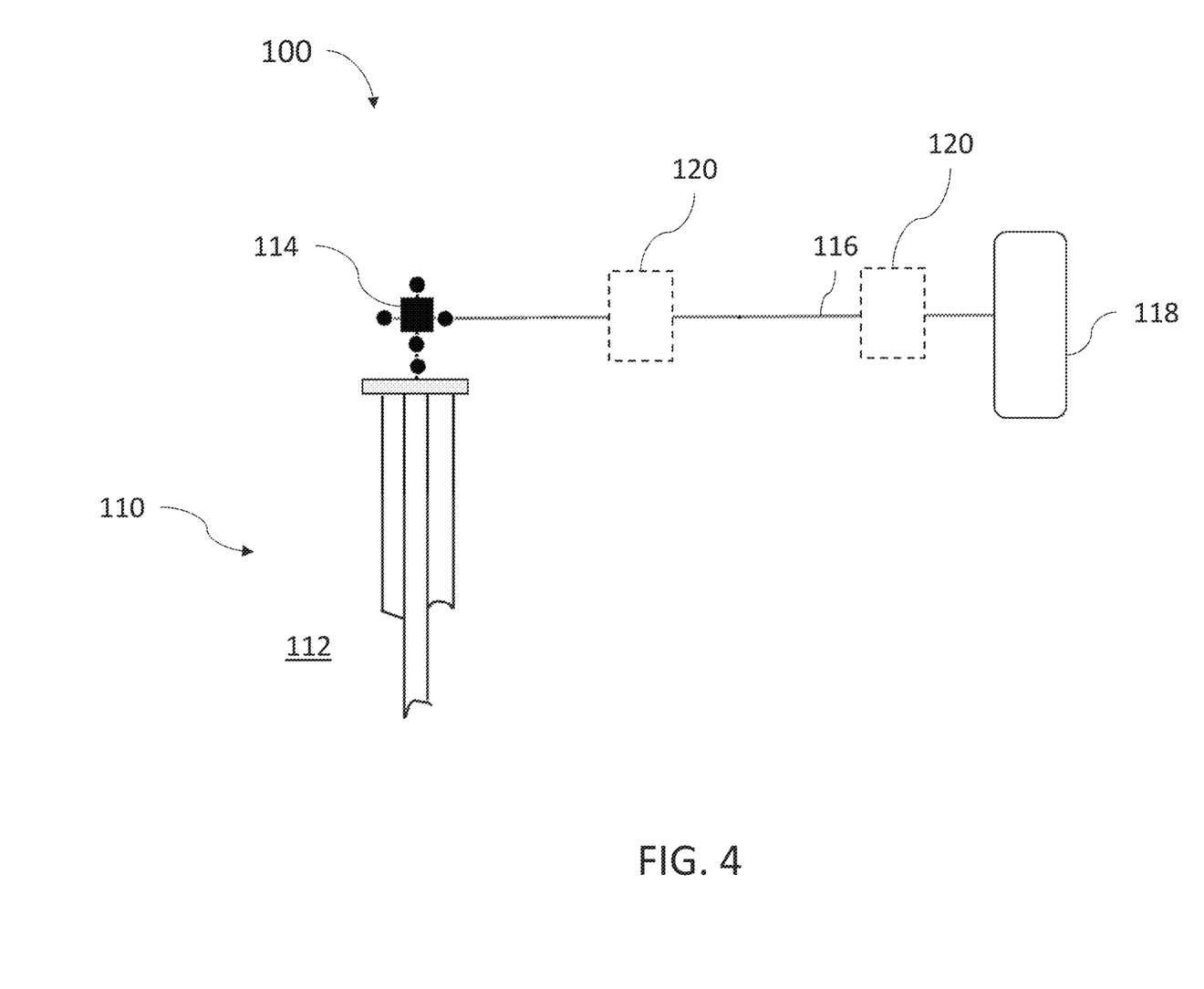
FIG. 4 is a schematic view of an oilfield facility.

For example, the oilfield facility 100 of FIG. 1 has one treatment system 120. Some oilfield facilities have multiple treatment systems disposed in parallel or in series. For example, facilities with longer flowlines can include multiple treatment systems 120 along the flowlines as shown in FIG. 4. Alternatively or additionally, individual treatments systems can be operated to increase initial inhibitor concentration at the discharge from the vessel. In facilities with multiple treatment systems at intermediate locations, the spacing between systems is determined by severity of scaling problem and inhibitor release rate from solid inhibitor product.

In another example, the actions recited in the claims can be performed in a different order and still achieve desirable results. In particular, the processes depicted in the accompanying figures do not necessarily require the particular order shown, or sequential order, to achieve desirable results. In certain implementations, multitasking and parallel processing may be advantageous. In addition, other steps may be provided, or steps may be eliminated, from the described flows, and other components may be added to, or removed from, the described systems.

Accordingly, other systems and methods are within the scope of the following claims.

What is claimed is:

1. A method of inhibiting scale in an oilfield facility, the method comprising:
    diverting a side stream of produced water from a wellhead, from a pipeline into a vessel containing a solid scale inhibitor material to release of active scale inhibition compounds from the solid scale inhibitor material into the diverted produced water;
    returning the diverted produced water containing the active scale inhibition compounds into the pipeline, wherein the solid scale inhibitor material remains in the vessel; and
    measuring the level of the scale inhibition compounds in the produced water in the pipeline downstream of the vessel; and
    adjusting, based on the measured level of scale inhibition compounds in the produced water in the pipe line downstream of the vessel, a flow rate of the diverted side stream of the produced water to change a level of active scale inhibition compounds in the flow of produced water in the pipeline by controlling a valve upstream of the vessel.

2. The method of claim 1, comprising replacing the solid scale inhibitor material when adjusting the flow rate of the diverted side stream fails to maintain the level of active scale inhibition compounds in the flow of produced water in the pipeline at or above a threshold level.

3. The method of claim 2, comprising setting the threshold level based at least in part on the length of flowlines through the oilfield facility.

4. The method of claim 1, wherein adjusting the flow rate of the diverted side stream comprises controlling a valve disposed in the pipeline between a location in the pipeline where the side stream is diverted and a location in the pipeline where the side stream is returned.

5. The method of claim 1, wherein adjusting the flow rate of the diverted side stream comprises controlling a valve downstream of the vessel.

6. The method of claim 1, wherein the pipeline is a surface pipeline and the flow of produced water is produced from a well of the oilfield facility.

7. The method of claim 1, wherein the active scale inhibition compounds comprise one or more of: phosphonates, phosphonate esters, and polymeric compounds.

8. The method of claim 1, wherein the solid scale inhibitor material is in the form of capsules, wherein the active scale inhibition compounds are enclosed by permeable or semipermeable materials.

9. The method of claim 1, wherein the solid scale inhibitor materials comprise a porous solid material with the active scale inhibition compounds adsorbed into the porous solid material.

10. The method of claim 1, comprising:
continuously diverting the side stream of the produced water from the pipeline into the vessel; and
continuously merging the diverted produced water containing the active scale inhibition compounds back into the flow of produced water in the pipeline.

11. The method of claim 1, wherein the solid scale inhibitor material comprises a porous solid material and active scale inhibition compounds absorbed on the porous solid material, wherein the porous solid material comprises clusters of nanoparticles and carbon nanotubes.

12. The method of claim 1, wherein the solid scale inhibitor material comprises a porous solid material and active scale inhibition compounds absorbed on the porous solid material, wherein the porous solid material comprises activated carbon.

13. The method of claim 1, wherein the solid scale inhibitor material comprises a porous solid material and active scale inhibition compounds absorbed on the porous solid material, wherein the porous solid material comprises zeolite.

14. A method of treating fluids in an oilfield facility, the method comprising:
diverting a side stream of produced water from a wellhead, from a pipeline into a vessel containing a solid material to release an active fluid treatment agent from the solid material into the diverted produced water;
merging the diverted produced water containing the active fluid treatment agent into the pipeline, wherein the solid material remains in the vessel; and
measuring the level of the active fluid treatment agent in the produced water in the pipeline downstream of the vessel; and
adjusting, based on the measured level of active fluid treatment agent in the produced water in the pipe line downstream of the vessel, a flow rate of the diverted side stream of the produced water to change a level of the active fluid treatment agent in the flow of produced water in the pipeline by controlling a valve upstream of the vessel.

15. The method of claim 14, wherein the fluid treatment agent comprises one or more of: corrosion inhibitors, paraffin inhibitors, asphaltene inhibitors, oxygen scavengers, biocides, gas hydrate inhibitors, salt inhibitors, foaming agent, emulsion breakers, and surfactants.

\* \* \* \* \*